Aug. 4, 1964  G. A. SCOTT  3,143,638
CONVERTIBLE DRAWER OVEN
Filed Sept. 27, 1962  4 Sheets-Sheet 1

INVENTOR
GEORGE A. SCOTT
BY Richard L. Caslin
HIS ATTORNEY

Aug. 4, 1964    G. A. SCOTT    3,143,638
CONVERTIBLE DRAWER OVEN
Filed Sept. 27, 1962    4 Sheets-Sheet 2

INVENTOR
GEORGE A. SCOTT
BY Richard L. Caslin
HIS ATTORNEY

Aug. 4, 1964

G. A. SCOTT 3,143,638

CONVERTIBLE DRAWER OVEN

Filed Sept. 27, 1962

INVENTOR
GEORGE A. SCOTT

BY *Richard L. Caslin*

HIS ATTORNEY

United States Patent Office 3,143,638
Patented Aug. 4, 1964

3,143,638
CONVERTIBLE DRAWER OVEN
George A. Scott, Jeffersontown, Ky., assignor to General Electric Company, a corporation of New York
Filed Sept. 27, 1962, Ser. No. 226,595
4 Claims. (Cl. 219—395)

The present invention relates to ovens and particularly to pull-out drawer ovens that are especially suited for domestic use in the home.

Extensive consumer surveys of the use of an oven by the average housewife have indicated that an oven is rarely used to capacity. By this is meant that the oven sizes are usually much larger than are necessary for the average sizes of foods that are cooked in the oven. However, there are many cooking operations which require more than one oven for maximum flexibility of meal planning. Typical examples where more than one oven would be needed are the following: simultaneously baking and broiling, warming and baking, or baking two items that require different oven temperatures.

The principal object of the present invention is to provide a domestic oven with convertible drawer compartments which provide the maximum utilization of the equipment in the minimum amount of space.

A further object of the present invention is to provide a convertible drawer oven having at least two stacked drawers forming two individual ovens, where the upper drawer is capable of being removed and inverted so as to form with the lower drawer a single large oven compartment.

A further object of the present invention is to provide a domestic oven with at least one insulated drawer oven with limited metal to metal contact between the drawer and its support means in a cabinet structure.

A further object of the present invention is to provide a drawer oven with plate type heaters forming part of the drawer construction.

A further object of the present invention is to provide an oven with at least one removable drawer which may be carried to the kitchen sink for ease in cleaning.

A still further object of the present invention is to illuminate a drawer oven by means external of the drawer.

The present invention, in accordance with one form thereof, comprises a cabinet structure having a pair of pull-out drawer ovens that are stacked one above the other within the cabinet to form two small oven compartments. The top drawer is capable of being removed from the cabinet and when it is inverted and returned to the cabinet it forms with the lower drawer a single large oven. Each drawer is provided with heating means that is separately controlled when the drawers are arranged as separate oven compartments. However, when the top drawer is inverted the two control means are unified into a single control means for both heating means. There are many modifications and subcombinations of this basic combination which could be incorporated in the finished product. For example, each drawer is preferably formed with insulated walls, while the outer cabinet structure is mainly uninsulated. Each drawer is so supported that there is limited metal to metal contact between the drawer and the cabinet in which it is supported so as to restrict the conduction of heat outwardly from the drawer to the cabinet. In some baking operations it is important to have both a top and a bottom heat source. This may be provided by including a heating means beneath the lower surface of the top wall of the cabinet for cooperation with the top drawer only. Of course, this heating means would be de-energized when the top drawer is inverted. Also, in the single large oven position there is a top and a bottom source of heat.

From a tooling cost point of view it is desirable to have both drawer structures built from the same tools, which explains why they are shown as being identical. However, it is to be understood that since the top and bottom drawers have different functions they need not be identical from the functional point of view. In other words, if the production quantities of this oven were high enough it would probably be more economical to design the two drawers to be dissimilar so that they would be designed to fulfill their intended purpose and would not include features in one that were only necessary in the other drawer. Another feature that has been found advantageous is the use of external lamp means mounted within the cabinet structure and cooperating with window means in the back wall of each drawer for illuminating the oven compartments.

While the control and power circuits for energizing the heating elements of the various ovens are shown and described in this application, they are not being claimed herein as they form the subject matter of copending application of George A. Scott, Serial No. 226,596, which is being filed concurrently herewith, and is likewise assigned to the General Electric Company, the assignee of the present invention.

My invention will be better understood from the following description taken in conjunction with the accompanying drawings and its scope will be pointed out in the appended claims.

Figure 1:
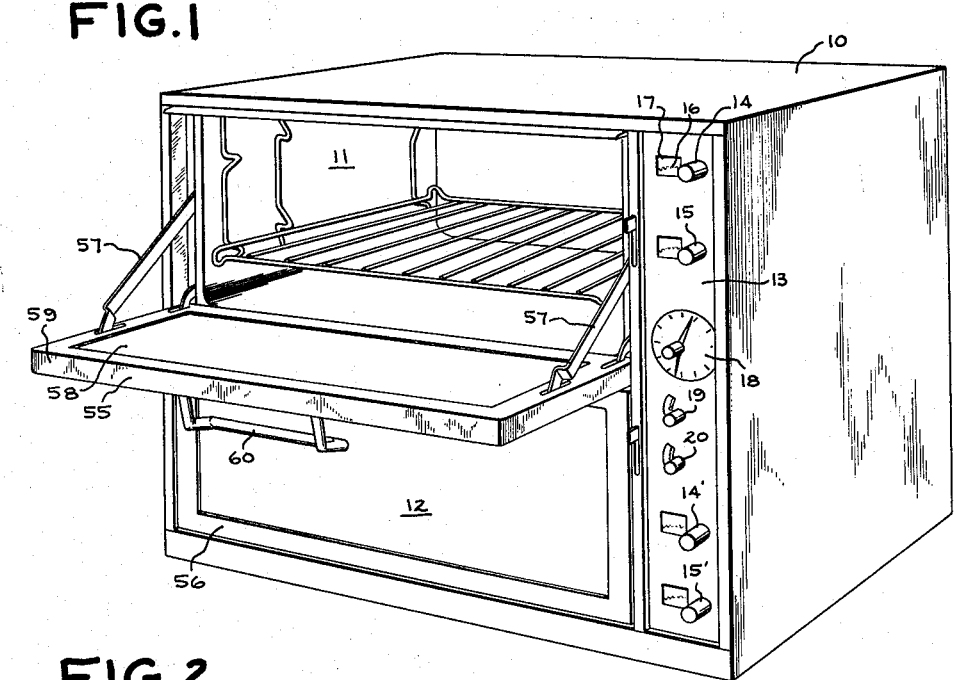
FIGURE 1 is a perspective view of a convertible drawer oven embodying the present invention showing the door of the top drawer in a horizontal fully open position.
Figure 5:
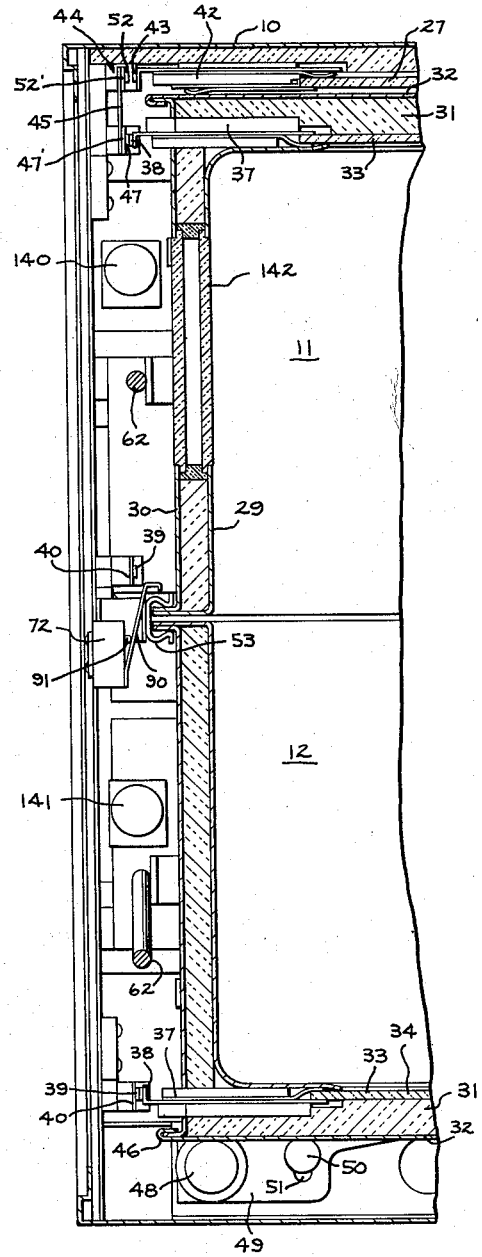
FIGURE 5 is a fragmentary cross-sectional elevational view through the back wall of the cabinet and taken on the line 5—5 of FIGURE 3 when there is but a single large oven as in the assembled view of FIGURE 2.
Figure 6:
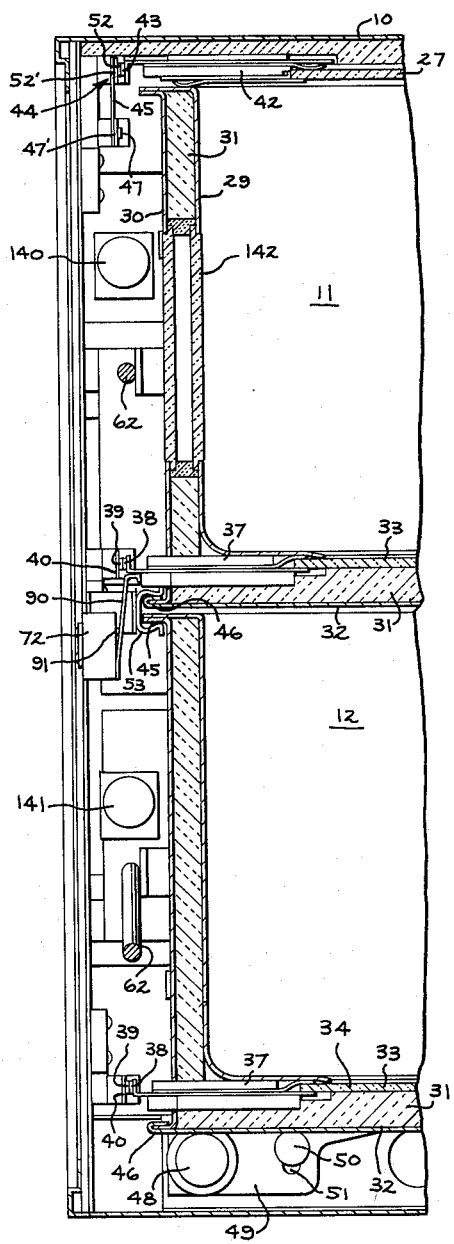
Figure 7:
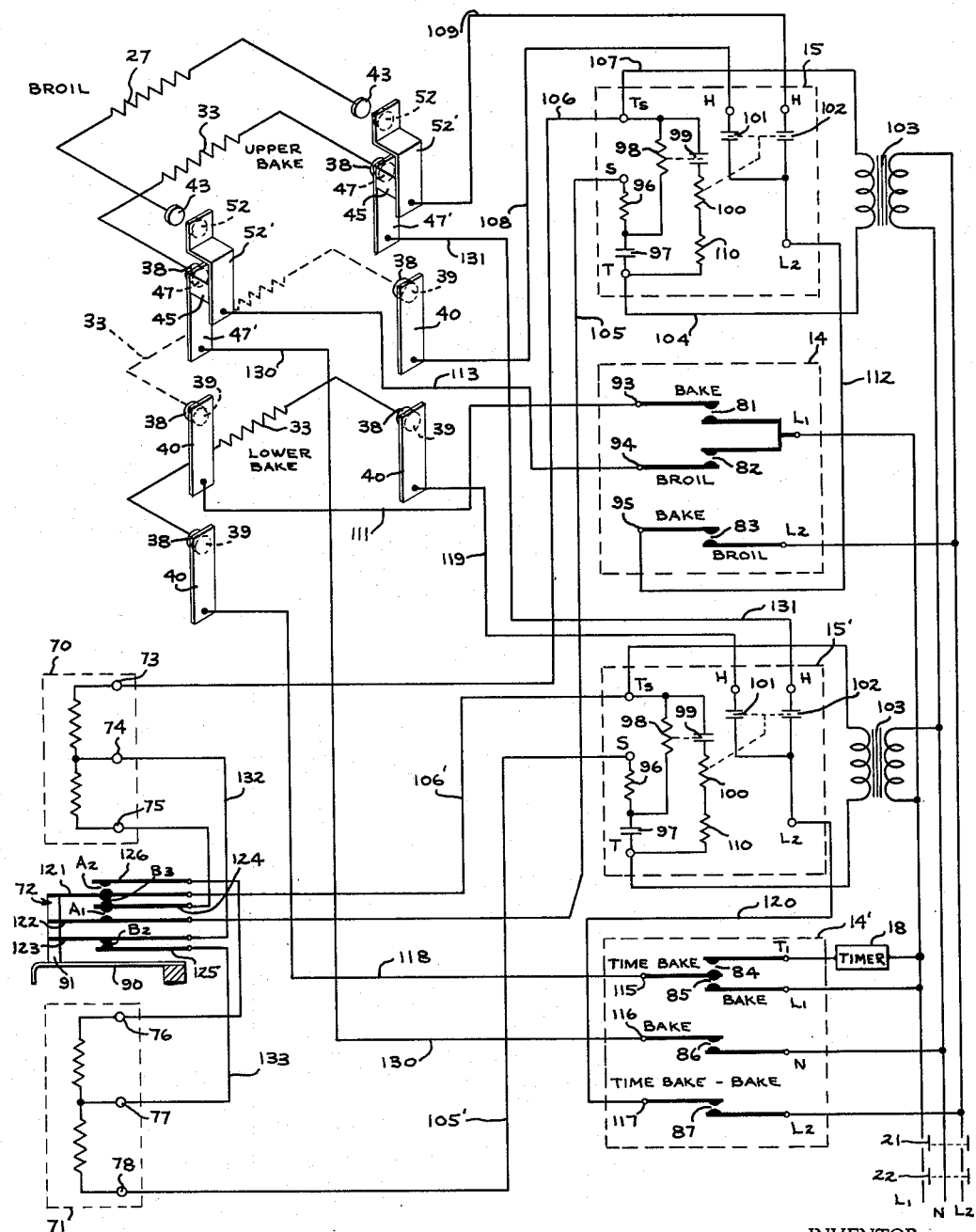

FIGURE 6 is a cross-sectional elevational view taken on the same line as FIGURE 5 but when the oven drawers are arranged as two separate oven compartments as in the assembled view of FIGURE 1; and FIGURE 7 is an energizing circuit diagram for the various heating units of the oven and it includes the temperature control circuit means, power circuit means and the interlock switch means for governing the heating units in the various positions of the drawer ovens.

Turning now to a consideration of the drawings and in particular to FIGURE 1, there is shown one embodiment of the invention comprising a cabinet structure 10 and a pair of pull-out drawer ovens 11 and 12 that are stacked one above the other within the cabinet to form two small oven compartments. A control panel 13 is located down along the right side of the cabinet between two closely spaced vertical cabinet walls, and it includes a temperature control means for each drawer as well as a timer for timing the heating operation of the lower drawer. For example, components 14 and 15 control the heating of the upper drawer 11. Component 14 is an oven selector switch and component 15 is a thermostat for setting the drawer temperature. Each component 14 and 15 includes an inner dial 16 behind the control panel which cooperates with an indicator window 17 in the panel for obtaining the proper setting of the control device. For the lower drawer 12 there is a comparable switch 14' and a comparable thermostat 15' and they have the added function of serving to control the single large oven when the upper drawer is inverted. Moreover, there is a clock-timer 18 cooperating with the controls 14' and 15' and it is furnished with a pair of adjusting knobs 19 and 20 for controlling the oven starting time and oven stopping time as will be well understood by those skilled in this art.

Figure 3:
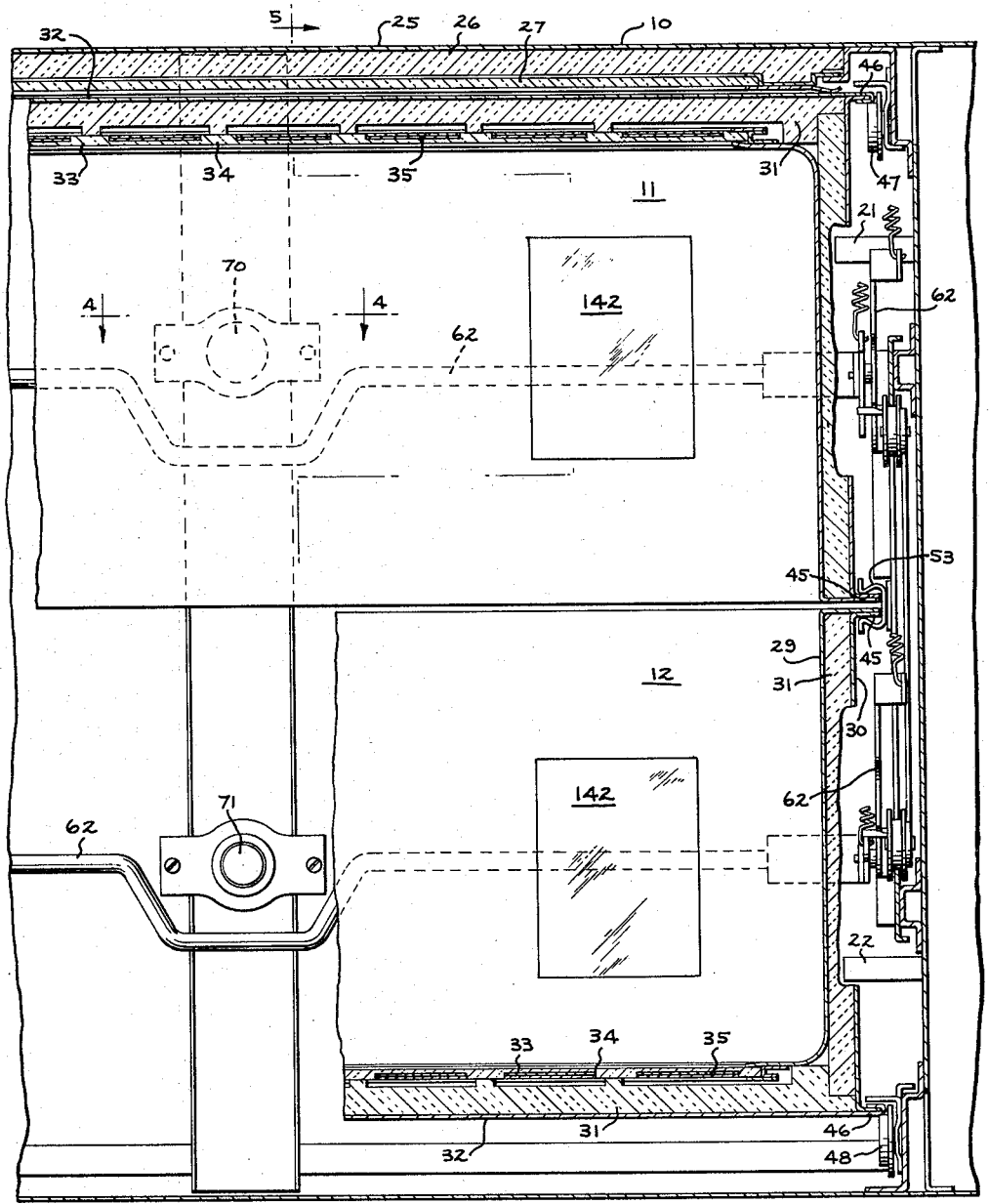
FIGURE 3 is a transverse cross-sectional elevational view of the oven of FIGURE 2 looking toward the back wall of the cabinet and showing the top drawer in the inverted position to form a single large oven.

As can be seen in the cross-sectional views of FIGURES 3, 5, and 6, the cabinet structure 10 is of thin walled sheet metal construction that is substantially uninsulated except for the top wall 25 of the cabinet which has an insulating panel 26 for separating the top wall 25 from an underlying plate heater 27. This heater 27 forms a broil unit for the upper drawer 11 when the upper drawer is supported in the cabinet in its upright position shown in FIGURE 1. Some means must be provided for retaining the heat in the drawer since very little heat retention is provided by the uninsulated cabinet 10 as described above. As best seen in FIGURE 6, each drawer 11 and 12 is of double sheet metal construction 29 and 30 with a semi-rigid block of insulation 31 sandwiched therebetween. It will be understood by those skilled in this art that an alternative would be to insulate all of the cabinet walls and to leave the individual drawers uninsulated.

The standard type of heat insulating material used in present day ovens is fiberglass in blanket or batt form, but it must be supported by some external means; therefore it contributes nothing to the structural strength of the oven. Since it is the intention of the present invention to be able to remove the upper drawer 11 and install it back in the cabinet in an inverted position, the weight of the drawer is a critical limiting factor because it is felt that it should be no heavier than about fifteen pounds which is believed to be about the maximum weight that the average housewife could be expected to handle for this size of drawer. Accordingly, in order to restrict the amount of weight of the drawer it was deemed expedient to substitute semi-rigid blocks of insulating material 31 so as to utilize the structural strength of the insulation and make it possible to use thinner gauge metal sheets 29 and 30 in the drawer construction. Moreover, by using thin metal sheets for the drawer the heat lost by conduction through the metal is further reduced. One type of satisfactory insulation is sold as "Thermobestos" board by the Johns-Manville Company. Another material would be potassium titanate sold by the DuPont Company, or calcium silicate that is available from many sources.

The insulated bottom wall 32 of each drawer 11 and 12 is supplied with a plate-type film heater 33 of the general type that is disclosed and claimed in the copending application of Bohdan Hurko, Serial No. 7,181, which was filed on February 8, 1960, and is assigned to the General Electric Company, assignee of the present invention. As seen in FIGURE 3, this film heater comprises a dielectric base material 34 in plate form of nearly pure silicon oxide that is sold under the trade name of "Vycor." To the underside of this base plate is fused a multi-layer metallic film 35 of noble metals such as platinum and gold in a particular relationship so as to prevent the crystallization of the conductive layers at high temperatures. The broil unit 27 mentioned previously as being positioned beneath the top wall 25 of the cabinet 10 is also a plate-type heater having multi-layers of film of noble metals.

One of the important advantages of using film heaters on a base plate as the heating element is that the plate is essentially self-cleaning, in that the high operating temperatures serve to burn off any food soil or grease spatter that might be deposited on the plate. Another real advantage of film heaters over metal sheathed heating units of the type used in standard ovens is that no extra space is required for the units for they are built into the bottom wall of the drawer. This was the primary reason for choosing film heaters in place of the conventional metal sheathed type. However, it is appreciated that metal sheathed units could be substituted adjacent the bottom of each drawer, but each drawer height would have to be increased approximately one inch, and approximately one additional inch would be required for the broil unit 27. Hence, the substitution of metal sheathed heating units would increase the over-all height of the cabinet by about three inches.

Before leaving the subject of film heaters, attention is directed to both FIGURES 5 and 6 which show a cross-sectional view through the back of the cabinet. Each drawer 11 and 12 is shown with a terminal block 37 that is fastened as an integral part to the film heater 33. Each terminal block 37 has a fixed contact member 38 which extends out the back of the drawer for making engagement with a movable contact 39 that is supported on the end of a cantilever spring 40 that is fastened to the back wall of the cabinet 10. The principle used here is that when each drawer 11 and 12 is inserted in an upright position in the cabinet an electrical connection will be made through the interlock switch means which comprises the fixed contact 38 and movable contact 39. Alternately, when the drawer is being pulled out of the cabinet these contacts will be separated and the power circuit for the film heaters 33 will be interrupted.

A master power interlock system is provided by a pair of single throw, double pole switches 21 and 22 which are connected in the supply leads of the oven ahead of the selector switches 14, 14' and thermostats 15 and 15'. Interlock switch 21 cooperates with the upper drawer 11, and the switch is closed when the drawer is located completely within the cabinet. If the drawer 11 is even slightly removed from the cabinet, the interlock switch 21 will completely de-energize the entire drawer oven. The second interlock switch 22 works in a similar fashion with the lower drawer 12.

Also to be noticed is that the broil unit 27 has a terminal block 42 with a fixed contact 43 that cooperates with a movable contact 46. It is necessary that this broil unit 27 be de-energized when the top drawer 11 is inverted. This feature is provided by a single throw double pole switch 44 that has a pair of movable contacts 52 and 47 which are joined together by an insulating block 45 and each contact is supported from a cantilever spring 52' and 47' respectively. The movable contact 47 is positioned to make engagement with the fixed contact 38 of the terminal block 37 of the upper drawer 11 in its inverted position. Accordingly, when the drawer 11 is inverted and inserted into the cabinet as shown in FIGURE 5, the fixed contact 38 of the drawer will displace the movable contact 47 backward thereby closing the circuit for the heater 33 of the drawer 11. Simultaneously, the other movable contact 52 is displaced from contact with the fixed contact 43 of the broil unit 27, since both movable contacts are supported on the common insulator block 45 and move in unison. Looking at FIGURE 6, when the top drawer 11 is in its upright position you will notice that the broil unit 27 is connected in its circuit by the normally closed contacts 43 and 52.

The drawers 11 and 12 are illuminated by external light sources such as fluorescent lamps 140 and 141 which are horizontally disposed on the back wall of the cabinet 10 and each lamp is in registry with a pair of windows 142 in each drawer for the passage of light into the drawers.

Experience has taught that about 42% of the heat loss from a standard oven is due to heat conduction through various points of metal to metal contact. Accordingly, it is well to reduce this amount of heat loss due to conduction by restricting the metal to metal contact from each drawer 11 and 12 and the supporting cabinet 10. The side and back walls of each drawer are all provided with upper and lower horizontal flanges 45 and 46, respectively. Each drawer is adapted to be supported by either its upper or its lower flanges from a series of flanged rollers 47 and 48 or slide means at the upper and lower corners respectively of the cabinet as seen in FIGURE 3. Both FIGURES 3 and 5 show the lower rollers 48 supporting the lower flange 46 of the lower drawer 12. These rollers 48 are about four in number in each series and they are supported from an adjustable bar 49 by means of fastener members 50 that extend through elongated openings 51 in the bar. The lower drawer 12 is always supported in an upright position on the lower rollers 48 by the lower flanges 46, while the upper drawer 11 is suspended from its upper flanges 45 on the upper rollers 47 in the single small oven position of FIGURE 6. Moreover, the upper drawer 11 is suspended from its lower flanges 46 on the top rollers 47 when the drawer 11 is inverted to form the single large oven illustrated in FIGURE 3.

One reason for locating the roller assemblies 46 and 47 along the top and bottom of the side walls of the cabinet is to provide space at the mid-height of the cabinet for a resilient metal gasket 53 that seals the drawer openings. As seen in FIGURE 3, the gasket is of generally C-shape in cross section and is adapted to extend around the three vertical walls of the cabinet; namely, the two opposite side walls and across the back wall of the cabinet so as to engage over the flanges 45 of both the bottom drawer 12 and the inverted top drawer 11 as seen in FIGURE 3 so as to seal the drawers against losses of heat and vapors that would otherwise occur through the gap between the two drawers. This same metal gasket 53 would also operate to seal the lower drawer 12 in the double small oven position of FIGURE 6 by encompassing the upper flange 45 of the lower drawer 12 and the lower flange 46 of the upper drawer 11.

Figure 2:
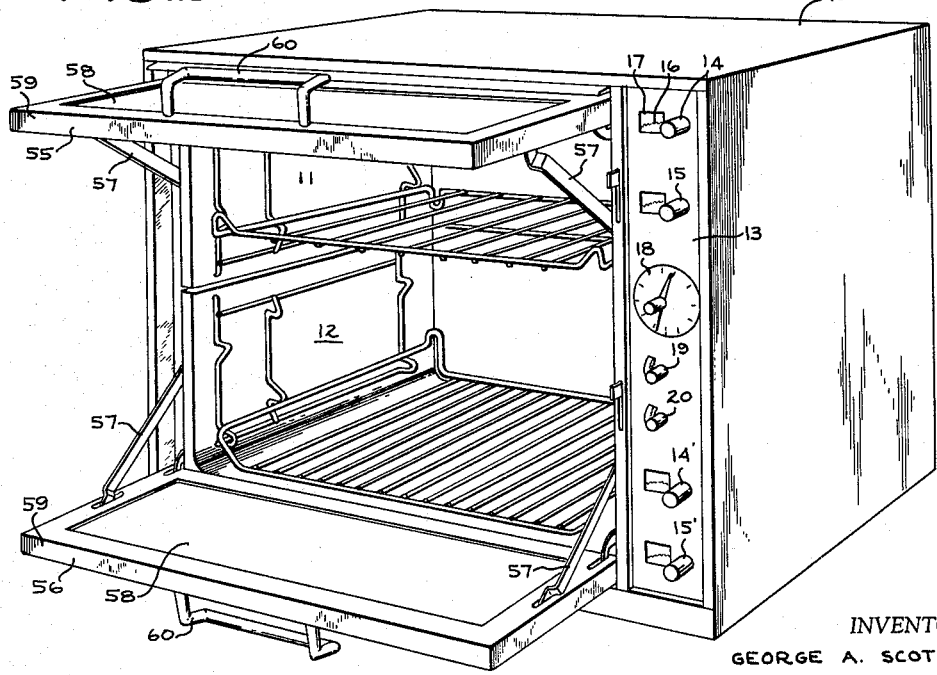
FIGURE 2 is a perspective view similar to that of FIGURE 1 showing the top drawer in an inverted position so it cooperates with the lower drawer in forming a single large oven, where both doors of the oven are swung to the horizontal fully open position.

Turning back to the consideration of the assembly view of FIGURES 1 and 2, it should be appreciated that the front wall of each drawer 11 and 12 is formed by a fold-down door 55 and 56 respectively which is hinged along the front edge of the bottom wall of the drawer and is provided with a pair of hinge straps 57 which help to support the door in a horizontal fully open position. Each hinge strap is pivotally mounted to the door at one end and slidably mounted to the drawer at the other end. Each door consists of double panes of tempered glass 58 which are supported in a narrow metal frame 59 so that the door is mostly transparent for ease of viewing within the ovens. A handle 60 is fastened on the door frame 59 adjacent the swinging edge of the door for grasping the door and swinging it between open and closed positions as well as for pulling the drawer out of the cabinet and returning the drawer to the cabinet.

An elaborate door linkage mechanism is provided within the cabinet but it is not described here as it forms the subject matter of a copending application of George A. Scott and Milton S. Williams, Jr., Serial No. 226,597, which is being filed concurrently herewith, and is likewise assigned to the General Electric Company, assignee of the present invention. The purpose of this mechanism is to (1) to lock the drawers 11 and 12 in a closed position within the cabinet 10, (2) to permit the doors 55 and 56 to be operated independently between open and closed positions while the drawers are locked closed in the upright positions, (3) to lock the doors closed when the drawers are unlatched from the cabinet and while they are being rolled outwardly, (4) and lastly, to connect the two doors 55 and 56 together when the upper drawer 11 is inverted so that the movement of either door 55 or 56 will cause simultaneous movement of the other door, for example, as shown in the horizontal fully open position of FIGURE 2. Some of the hardware for this door mechanism is identified in general only as element 62 although it is not further described herein.

Figure 4:
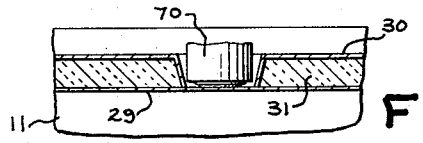
FIGURE 4 is a fragmentary cross-sectional plan view of a temperature sensor that is bearing against the oven liner wall of the upper drawer, the view being taken on the line 4—4 of FIGURE 3.

Attention will now be directed to the means for energizing and controlling the heating elements of the various ovens. In order to understand the circuit it is necessary to know that there are two external, spring biased, temperature sensors 70 and 71 fastened to the interior of the cabinet 10 and each adapted to bear against the outer surface of the innermost oven liner wall 29 of one of the oven drawers 11 and 12 so as to be in heat transfer relation therewith. FIGURE 3 of the drawings shows these temperature sensors vertically spaced from each other and each adjacent the respective heating elements 33, 33, while FIGURE 4 is a fragmentary view in cross-sectional plan view showing the recess formed in the back wall of the drawer 11 so that the spring-biased temperature sensor may bear against the outer surface of the oven liner wall 29 of the drawer.

A suitable type of temperature sensor is a variable-resistance transducing device for reflecting minute changes of experienced temperature into corresponding variations in the output characteristic of the device. Such a temperature sensor is of a general type disclosed in the Sivacek Patent 2,980,875, which is assigned to the King-Seeley Corporation. This same general type of temperature sensor is widely used today as an automatic control device for the surface unit of an electric range. It is usually located in the center of the surface unit so as to be spring-biased upwardly into good metal contact with the bottom of the pan being heated on the unit. Each sensor may be constructed of fine wire such as platinum having a high positive temperature coefficient of resistance, or as an alternative a ceramic thermistor element may be used having a high negative coefficient of resistance. It is to be understood that the use of a negative coefficient material reverses the action of the thermostat. For purposes of the description of the present invention, the sensor has a high positive temperature coefficient of resistance.

Heretofore, oven temperatures have been controlled by means of detecting variations in the air temperature within the oven. The variation is then transmitted either by means of a hydraulic or an electrical system to a thermostat that controls the oven at a desired preset temperature. The present invention departs from the prior art by controlling the oven temperature by means of controlling the oven liner wall temperature rather than the oven air temperature. This is possible because of the large thermal mass of the oven liner wall as compared to the air contained in the oven. There is not only one but there are two external sensors 70 and 71. These sensors operate as separate control means when the two drawers are mounted in the upright positions in the cabinet. The same external sensors 70 and 71 are connected in series when the upper drawer 11 is inverted to form with the lower drawer 12 a single large oven. Then each sensor is connected in the control circuit so that only one-half of its electrical resistance is in the circuit so that the signal from each sensor when added together gives the effect of one detector sensing the average temperature of each individual sensor, thus preventing both excessive overshoot and undershoot of the desired preset temperature.

It is felt that the dual external sensors operate in a superior fashion for a single large oven as compared with an oven control which only senses the temperature of the oven air. Some of the reasons deduced for this superior operation is (1) the two sensors located on the oven liner tend to average out the oven liner wall temperature. This averaging minimizes the tendency of the temperature to overshoot on the first cycle of oven operation. (2) Some food loads such as cookies using a large imperforate cookie sheet tend to divide the oven compartment into two distinct temperature zones. In a standard oven with an air temperature sensing control, the lower portion of the oven below the cookie sheet becomes overheated because it is isolated from the normal thermostat location. By means of dual external sensors, the back wall of the oven liner becomes hotter on the lower portion, and the lower sensing unit detects this overtemperature condition and opens the thermostat contacts until the upper portion of the wall has had an opportunity to equalize in temperature. (3) A factor that is important with regard to oven liner temperature control is the fact that much of the cooking energy is obtained from re-radiation from the oven liner wall. This is particularly true in the case of an oven liner which has a high emissivity coating, such as porcelain enamel. By controlling the oven liner walls at a desired temperature, it is possible to obtain the best balance of heat energy for any given cooking load. (4) Another important advantage of an external oven liner temperature control system is that all of the control mechanism is removed from the inside of the oven compartment thus resulting in a less cluttered appearance and removing the possibility of the housewife damaging the control inadvertently as during the cleaning of the oven.

Turning now to a consideration of the circuit diagram of FIGURE 7, a review will first be made of the larger elements of the circuit which have been discussed heretofore. There are two heating units 33 one of which is located in each drawer oven 11 and 12, as well as the broil unit 27 which is located beneath the top wall of the cabinet 10. The upper heating unit or bake unit 33 is shown in full lines in the inverted position of the drawer as in FIGURE 3, while the same upper bake unit 33 is shown in dotted lines to illustrate how it would be energized if it were in the upright position of FIGURE 6.

The manual controls for the upper drawer 11 are represented by the selector switch 14 and the thermostat 15 which are each shown in the circuit diagram as being encompassed by a dotted square. Moreover, the controls for the lower drawer 12 are represented by the oven switch 14' and the thermostat 15' as well as by the timer 18. The dual external sensors 70 and 71 are shown at the lower left hand corner of the diagram and they are tied into a drawer interlock switch 72 which has not been mentioned heretofore. It is a double throw gang switch that is illustrated in FIGURES 5 and 6 of the drawings as being acted upon by the top drawer 11. In other words, the drawer interlock switch 72 is operated upon by the upper drawer 11 to be in one of two possible positions. The first switch position would be that of FIGURE 6 where the terminal block 37 of upper drawer 11 presses against a switch lever 90 so as to depress a switch button 91 that underlies the lever. This switch position separates the two sensors 70 and 71 electrically from each other so that there are in effect two separate temperature control systems; namely, the upper system and the lower system. This is necessary because the two drawers are in their upright positions thereby forming with the cabinet 10 two small individual oven compartments.

In the second position of the switch 72, the switch lever 90 is free of contact with the upper drawer 11, as is best seen in FIGURE 5, because the drawer 11 has been inverted and assembled back into the cabinet to form with the lower drawer 12 a single large oven. This second position of the drawer interlock switch 72 takes the upper switch 14 and thermostat 15 out of the circuit so that all of the temperature control is in the lower set of controls 14' and 15'. Moreover, the two external sensors 70 and 71 are connected in series by center taps 74 and 77 respectively so that each contribute one-half of the required resistance. The lower bake unit 33 of drawer 12 is operated at full wattage across lines L1 and L2 at 236 volts, while the upper bake unit 33 of drawer 11 is operated at one-half wattage across lines L1 and Neutral at 118 volts. This will all appear much clearer as the details of the circuit are explained with relation to the circuitry connecting all of these elements.

The power is supplied from the usual single phase, 236 volt, alternating current, three-wire Edison service entrance commonly found in an adequately-wired residence. The three wires are identified as line wires L1 and L2 and the Neutral wire N, it being understood that there is a potential of about 236 volts across lines L1 and L2, and about 118 volts across either line L1 or L2 and the Neutral wire N. Notice the master power interlock switches 21 and 22 in the power leads L1 and L2 for de-energizing the oven completely whenever either drawer 11 or 12 is even slightly displaced from the cabinet 10. Considering the top drawer 11 and its controls 14 and 15, the oven selector switch 14 is interposed between the source of voltage and the heating elements 27 and 33 in order to control the amount of power available to convert to heat energy within the upper drawer. The oven selector switch 14 has but two line terminals identified as L1 and L2 to conform with the identification of the wires bringing current to the switch. There are also two load terminals 93 and 94 and a third terminal 95 that is to be wired to the thermostat 15. The switch 14 includes three sets of switch contacts 81, 82 and 83. During a baking operation when only the drawer heating element 33 is energized, the contacts 81 and 83 are closed. For the broiling operation when only the broil unit 27 is energized, the contacts 82 and 83 are closed.

Before tracing the power circuit for the different cooking operations of the oven, a brief description of the thermostat 15 will be given. Since it is identical with the second thermostate 15', one explanation will suffice for both. In describing the temperature sensors 70 and 71 mention was made that a detailed explanation of a typical sensor except that it is not center tapped can be had by studying the Sivacek Patent 2,980,875. The thermostat 15 is also a standard item of commerce and a detailed explanation of it can be had by referring to the Woodward Patent 2,970,201, which is likewise assigned to the King-Seeley Corporation. The thermostat 15 has a pulsing thermal relay 96 with contacts 97 that is controlled by the variable-resistance sensor 70. The thermal relay in turn controls a responder relay 98 with contacts 99 which controls an output relay 100 with double pole contacts 101 and 102 that finally controls the energization of the heating elements 33 and 27 of the upper drawer compartment from a source of voltage.

This control circuit operates at a relatively low potential of about 12 volts supplied from the secondary of a step-down transformer 103. The thermostat 15 has 6 terminals; namely, terminal L2 that is connected through the switch 14 to line L2, terminal T which is connected to one side of the secondary of the transformer 103 by lead 104, terminal S which is connected to the sensor 70 by means of lead 105 and the drawer interlock switch 72, terminal TS which is connected to both the sensor 70 and the transformer by means of leads 106 and 107 respectively, and finally the two heater terminals H and H which are connected to the return side of the movable contacts 39 and 52 for the upper drawer 11 by means of leads 108 and 109 respectively. Cooperating with the voltage regulating thermal relay 96 is an anticipator winding 110 which is adapted to be wound on the back leg of a U-shaped voltage regulator bimetal (not shown) so that if the line voltage drops it tends to open the relay contacts 97 sooner thereby keeping the responder contacts 99 closed slightly longer and consequently adjusting the "On-Off" ratio to maintain a desired output. Thus, overcompensation is achieved to give a more perfect control of the power fed to the heating elements.

Now tracing the power circuit for the Baking operation of the upper individual oven 11 for which the upper bake unit 33 is operated at full wattage across lines L1 and L2 at 236 volts; from line L1 to terminal L1 of the oven selector switch 14, through contacts 81 of the switch and out load terminal 93, through a lead 111 to the movable contact 39 that is supported within the cabinet, through fixed contact 38 of the drawer, through the plate heating element 33 shown in dotted lines to the other fixed contact 38, through movable contact 39, and by means of lead 108 to the thermostat terminal H and then back to the other side of the line out of terminal L2 of the thermostat and by means of a lead 112 to the switch terminal 95, through switch contacts 83 to line L2.

The power circuit for a Broiling operation of the upper oven 11 energizes the broil unit 27 only at full wattage and the circuit may be traced as follows: from line L1 to terminal L1 of the switch 14, through contacts 82 to the load terminal 94 of the switch, by means of lead 113 to the movable contact 52 and fixed contact 43 of the broil unit 27, through broil unit 27 to the other fixed contact 43, and by way of movable contact 52 and lead 109 to the second terminal H of the thermostat 15, then from thermostat terminal L2 through lead 112 to the switch terminal 95, and through switch contacts 83 to line terminal L2 and then to line L2.

Before discussing the control circuit, the several power circuits for the lower drawer 12 will first be explained. The lower oven control switch 14' is provided with two single pole switch contacts 86 and 87 and one set of single pole, double throw switch contacts 84 and 85. These contacts are labeled with the functions they accomplish to assist in explaining when they are closed. Contacts 84 are closed during a Timed Baking operation, both contacts 85 and 86 are closed during a Baking operation in the small individual oven 12 and during a Baking operation in the single large oven when the top drawer 11 is inverted. Finally, contacts 87 are closed during all operations of the circuits, namely, during Time Bake and Bake in both the individual oven and in the large oven. This lower switch 14' is provided with three line terminals L1, N, and L2 as well as a timer terminal T1, and three load terminals 115, 116, and 117. Now tracing the simple power circuit for the Baking operation in the lower individual oven 12 in which the bake unit 33 is operated alone at full wattage across 236 volts: the circuit is from line L1 to the switch terminal L1, through switch contacts 85 to terminal 115 and then by means of lead 118 to the movable contact 39 of the cabinet and then to the fixed contact 38 of the lower drawer 12, through the drawer heater 33 to the other fixed contact 38, through the movable contact 39 and back to the thermostat by means of lead 119 to the thermostat terminal H, and then from thermostat terminal L2 by means of lead 120 to terminal 117 and through switch contacts 87 to terminal L2 and then to line L2.

The other operation for the small individual oven 12 is a Time Baking operation where the same drawer heater 33 is energized, but the circuit is controlled by the timer 18 which is shunted across the switch terminal L1 and switch contacts 85 by means of the switch contacts 84. Otherwise the circuit is the same as mentioned immediately above.

The only other power circuit is when the two drawers 11 and 12 are combined to form a single large oven as is shown in FIGURE 2. In this position both drawer heating units 33, 33 shown in full lines in FIGURE 7 are energized. The heating element 33 of the upper drawer is operated at one-half wattage across line L2 and Neutral at 118 volts, while the heating element 33 in the lower drawer 12 is operated at full wattage across lines L1 and L2 at 236 volts. Three of the switch contacts are closed; namely, 85, 86 and 87.

The one portion of the circuit diagram which has not been described is the control circuit, but before discussing it in detail mention will be made first of the drawer interlock switch 72. This switch has a switch lever 90 which acts upon a switch button 91 that supports a gang of three movable contacts 121, 122 and 123. Contacts 122 and 123 are single pole switch contacts that cooperate with fixed contacts 124 and 125. The movable contact 121 is part of a single pole double throw switch formed with contacts 124 and 126. For example, the contacts 121 and 126 form switch contacts A2, contacts 121 and 124 form contacts B3, contacts 124 and 122 form contacts A1, and contacts 123 and 125 form contacts B2. Next the external sensors 70 and 71 are provided with three terminals; namely, two end terminals 73, 75 and 76, 78 respectively, and a center tapped terminal 74, 77 respectively. To summarize the function of this drawer interlock switch 72, contacts A1 and A2 are closed when the two drawers 11 and 12 are assembled upright to establish two single oven compartments so that there are two separate temperature control systems namely 14 and 15 and 14' and 15' and the full resistance in each external sensor 70 and 71 is used for each oven compartment. When the oven is converted into a single large oven by inverting the top drawer 11, the contacts B2 and B3 of the drawer interlock switch 72 are closed and the other contacts A1 and A2 are open so as to de-energize the upper switch 14 and thermostat 15 as well as the broil unit 27 and for utilizing only one-half of the resistance of each external sensor 70 and 71 in series so that they have the combined effect of a single sensor working with the thermostat 15'.

In summary there are three safety interlock switch means; namely, (1) the master power interlock switches 21 and 22, (2) the drawer interlock switch 72, and (3) the broil unit interlock switch 44.

Going back to a consideration of the double small oven compartments 11 and 12 of FIGURE 1, the control circuit for the upper oven would be from the terminal S of thermostat 15 through lead 105 to drawer interlock switch 72 and contacts A1 to terminal 75 of the upper sensor 70 through the full resistance of the sensor, from sensor terminal 73 through lead 106 to the thermostat terminal TS. Similarly, the lower sensor 71 would be connected to the thermostat 15' by means of leads 105' and 106' through the drawer interlock switch contacts A2 and through sensor terminals 76 and 78.

The control circuit for the single large oven would have the three sets of switch contacts 85, 86 and 87 closed in the lower oven switch 14'. The bake unit 33 of the upper drawer 11 would be connected through the lower switch 14' to Neutral wire N by way of contacts 86, lead 130, contacts 47, 38, heating unit 33, contacts 38, 47, lead 131, into thermostat terminal H, and out from thermostat terminal L2 through lead 120 to the switch contacts 87 and line L2. Hence, the upper heating unit 33 is operated at half wattage across line L2 and the Neutral wire at 118 volts.

Simultaneously, the lower drawer heating unit 33 is energized across lines L1 and L2 in the following manner: from line L1, switch terminal L1, switch contacts 85, terminal 115, lead 118, through contacts 39 and 38, through the lower drawer heating unit 33 and contacts 38 and 39, through lead 119 to thermostat terminal H and then by means of lead 120, terminal 117 and switch contacts 87 to line L2. The control circuit may be followed from thermostat terminal TS of lower thermostat 15', lead 106', switch contacts B3 to upper sensor terminal 75, through one-half resistance of this sensor 70 to center tap terminal 74 and then by means of lead 132 back to switch contact B2 and by lead 133 to the center tap 77 of the lower sensor 71 and then through the lower half of the resistance of the sensor to sensor terminal 78 and then by means of lead 105' to the thermostat terminal S. Thus one-half of the resistance of each sensor 70 and 71 is placed in series with the other for controlling the lower thermostat 15'.

Modifications of this invention will occur to those skilled in this art and therefore it is to be understood that this invention is not limited to the particular embodiments disclosed but that it is intended to cover all modifications which are within the true spirit and scope of this invention as claimed.

What I claim as new and desire to secure by Letters Patent of the United States is:

1. An electric oven for domestic use comprising a cabinet structure and a pair of similar drawer ovens mounted one above the other within the cabinet to form two individual oven compartments, the cabinet being an enclosure having a bottom wall, parallel side walls, a top wall, a back wall and an open front portion through which the drawer ovens are installed into the cabinet, each drawer oven having a bottom wall, parallel side walls, a back wall, a fold-down oven door at its front, and an open top portion, flange means along both the top and bottom edges of the side walls of each drawer, slide means within the cabinet for supporting the bottom drawer on its bottom flanges and for supporting the top drawer on its top flanges, the top drawer being removable from the cabinet whereby the drawer may be inverted and returned to the cabinet to be supported from the slide means by its bottom flanges so as to form with the lower drawer a single large oven compartment, a heating element within the bottom wall of each drawer and a third heating element beneath the top wall of the cabinet, so that the small bottom oven compartment has a single lower heating element and the small top oven compartment has both an upper and a lower heating element, the single large oven compartment also having an upper and a lower heating element formed by the heating element in the bottom wall of each drawer.

2. A convertible drawer oven comprising a cabinet structure and a pair of upright drawer members each individually supported one above the other within the cabinet to form with the cabinet structure two small baking ovens, each drawer having a front wall formed by a fold-down door structure for gaining access thereto, and releasable locking means for holding each door closed, heating means provided for each drawer and separate control means governing the energization of the heating means of each drawer oven for independent operation, the top drawer being removable from the cabinet and replaceable in an inverted position to form with the lower drawer a single large roasting oven, and interlock switch means engageable by the upper drawer in its inverted position for disabling one of the control means and connecting the heating means of both drawers to the remaining control means.

3. A convertible drawer oven comprising a cabinet structure and a pair of upright drawer members each individually supported one above the other within the cabinet to form with the cabinet structure two small baking ovens, each drawer having a front wall formed by a fold-down door structure for gaining access thereto, and releasable locking means for holding each door closed, the bottom portion of each drawer oven including a heating element, the underside of the top wall of the cabinet structure including a third heating element, a first control means for energizing the two heating elements in the top compartment formed by the upper drawer, a second control means for energizing the heating element in the lower compartment formed by the lower drawer, the top drawer being removable from the cabinet and replaceable in an inverted position to form with the lower drawer a single large roasting oven, and interlock switch means engageable by the upper drawer in its inverted position for disabling one of the control means as well as the said third heating element and connecting the two remaining heating elements of the drawers to the remaining control means.

4. A domestic oven comprising a thin-walled cabinet structure open at the front and a pair of upright drawer members each individually supported one above the other within the cabinet to form with the cabinet structure two small baking ovens, each drawer having a front wall formed by a fold-down door structure for gaining access thereto, outer flange means along both the top and bottom edges of the side walls and back wall of the top drawer and outer flange means along the top edge of the side walls and back wall of the bottom drawer, heating means provided for each drawer, and gasket means supported within the cabinet structure and engageable between the top flange of the bottom drawer and the bottom flange of the top drawer for preventing the dissipation of heat from the bottom drawer, the top drawer being removable from the cabinet and replaceable in an inverted position to form with the lower drawer a single large roasting oven, said gasket means then being engageable between the top flange of the bottom drawer and the top flange of the inverted top drawer for preventing the dissipation of heat from the large roasting oven.

References Cited in the file of this patent
UNITED STATES PATENTS

| | | |
|---|---|---|
| 1,375,801 | Ross | Apr. 26, 1921 |
| 1,406,372 | Grapp | Feb. 14, 1922 |
| 2,535,379 | White | Dec. 26, 1950 |
| 2,667,399 | Swimmer | Jan. 26, 1954 |
| 2,784,973 | Nemec | Mar. 12, 1957 |
| 2,798,930 | Frost | July 9, 1957 |
| 2,879,370 | Kesling | Mar. 24, 1959 |